United States Patent [19]

Richard

[11] Patent Number: 4,458,854

[45] Date of Patent: Jul. 10, 1984

[54] MAGNETIC CLUTCH HAVING APPARATUS FOR CENTERING MAGNETIC RECORDING TAPE REEL

[75] Inventor: Maurice E. Richard, Tucson, Ariz.

[73] Assignee: International Business Machines Corporation, Armonk, N.Y.

[21] Appl. No.: 434,450

[22] Filed: Oct. 15, 1982

[51] Int. Cl.³ .............................................. B65H 17/02
[52] U.S. Cl. .................................. 242/68.1; 242/68.3; 242/201
[58] Field of Search ................... 242/46.2, 68.1, 68.3, 242/129.7, 200–205, 207, 155; 200/48 R, 163; 360/129, 96.1, 96.5; 209/212–232

[56] References Cited

U.S. PATENT DOCUMENTS

| | | | |
|---|---|---|---|
| 3,083,925 | 4/1963 | Schoebel | 242/200 |
| 3,716,202 | 2/1973 | Thomas | 242/118.7 |
| 3,751,042 | 8/1973 | Platt | 242/200 X |
| 3,806,902 | 4/1974 | Drees et al. | 360/129 |
| 3,864,744 | 2/1975 | Uemura | 360/96 |
| 3,940,081 | 2/1976 | Kubicki, Sr. | 242/68.5 |
| 4,288,667 | 9/1981 | Patel et al. | 200/48 R |
| 4,343,441 | 8/1982 | Graham | 242/68.1 |

Primary Examiner—Leonard D. Christian
Attorney, Agent, or Firm—Pollock, Vande Sande & Priddy

[57] ABSTRACT

Apparatus is described for improving a magnetic clutch assembly for holding a magnetic tape reel. The magnetic clutch assembly has a center pole piece which is positioned during loading of the tape reel in an aperture of the tape reel base. The center pole piece distal end includes a non-magnetic pole piece which reduces the influence of the magnetic force on the tape reel during loading.

3 Claims, 4 Drawing Figures

MAGNETIC CLUTCH HAVING APPARATUS FOR CENTERING MAGNETIC RECORDING TAPE REEL

The present invention relates to a magnetic clutch assembly for holding during rotation magnetic tape reels. Specifically, an improvement is described for facilitating loading of a tape reel on a clutch assembly.

Magnetic tape drive systems for reading and writing information on a magnetic tape are well known. These tape drive systems include tape transports which maintain rotation of two tape reels in a predetermined relationship for processing information on the tape.

In tape transports for processing high speed digital data, large acceleration and deacceleration forces are experienced on the tape reels. Magnetic clutch assemblies have been developed to provide a large clamping force maintaining the magnetic tape reel in engagement with the driving member.

One such magnetic clutch assembly is described in U.S. Pat. No. 4,343,441. The clutch assembly of this reference includes a doughnut shaped magnet having a centrally located pole piece which is received in an aperture of the base of a magnetic tape reel. The center pole piece has a length which confines the magnetic flux lines of the doughnut shaped magnet to avoid damaging the recorded information during loading and unloading of the tape reel. Once the tape reel is in place over the doughnut shaped magnet, the base portion functions as a shunt confining the bulk of the magnetic flux to below the base of the magnetic tape.

The tape reel is in many tape drive systems part of a cartridge loaded by sliding it across the spindle. The aperture in the tape reel base portion is positioned to be centered with the center pole piece. The base portion is often attracted to the center pole piece misaligning the base portion aperture with the pole piece. If the reel becomes titled with respect to the pole piece, it is possible for the base portion to complete the magnetic flux path for the pole piece and magnet. The result is a misalignment of the reel base portion with the clutch which inhibits loading of the reel in the clutch assembly.

The present invention is an improvement to the aforesaid magnetic clutch assembly which reduces the incidence of misalignment of the reel base with the magnetic clutch assembly.

SUMMARY OF THE INVENTION

It is a primary object of this invention to provide apparatus for improving the loading efficiency of a magnetic tape reel on a tape transport.

It is a more specific object of the invention to reduce the magnetic interaction between the base of a tape reel being loaded in a magnetic clutch assembly with the center pole of the magnetic clutch assembly.

These and other objects are accomplished by apparatus in accordance with the present invention. The center pole piece of a magnetic clutch assembly is provided with a nonmagnetic means at the distal end thereof which reduces the magnetic interaction between a magnetic tape reel being loaded and the magnetic clutch assembly. The nonmagnetic means may be a bushing of stainless steel, or equivalent material. If during loading of a magnetic tape reel, the reel tilts towards the clutch magnet, the bushing will interrupt the flux path which in the prior art clutch assemblies passes through the clutch magnet, base portions, and center pole.

DESCRIPTION OF THE PREFERRED EMBODIMENT

Figure 1:
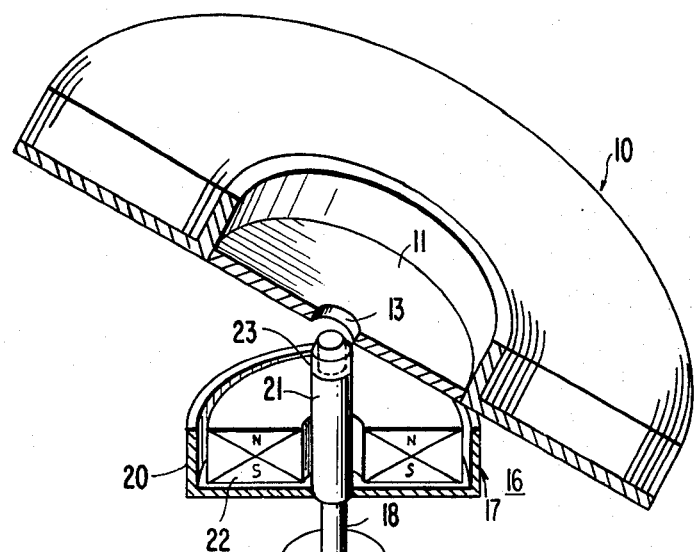
FIG. 1 is a schematic view which illustrates the misalignment which results during loading of a magnetic tape reel in a magnetic clutch assembly.

Referring now to FIG. 1, there is shown a magnetic clutch assembly 17 receiving a magnetic tape reel 10. The magnetic tape reel 10 is shown in misalignment with the magnetic clutch assembly 16. The center pole piece 21 of the magnetic clutch 16 includes at a distal end a nonmagnetic bushing 23.

Figure 2:
FIG. 2 is a schematic view which illustrates the loaded magnetic tape clamped in the magnetic clutch assembly.

The magnetic tape reel 10 includes a base portion 11 which is a metal plate of magnetic material. An aperture 13 in the base portion 11 receives the center pole piece 21. When the magnetic tape reel 10 is properly centered with respect to the center pole 21, the tape reel 10 descends into contact with clamping arrangement 16 as shown in FIG. 2. The clamping arrangement 16 includes a cup like member 17 rotated by a shaft 18 of motor 14. A center pole piece 21 is located coaxially with the motor shaft 18. A drive motor 14 rotates the cup like member 17 and pole piece 21. The cup like member 17 includes a flange member 20 which, as seen in FIG. 2, supports the loaded magnetic tape reel 10 for rotation. A doughnut shaped magnet 22 is maintained concentric with the center pole piece 21 along axis 19.

Figure 3:
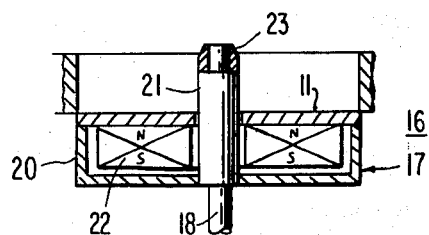
FIG. 3 is a schematic view which illustrates the modification of the flux field which results from bushing 23 of the center pole piece 21.

Referring now to FIG. 3, the effect of the nonmagnetic bushing 23 is shown on the magnetic flux lines emanating from doughnut shaped magnet 22. The magnetic flux in the region of the bushing 23 is relatively weak. The presence of the bushing 23 reduces the magnetic force between the surface adjacent aperture 13 and the center pole piece 21 such that centering of the tape reel 10 with respect to the center pole piece 21 is facilitated. Once centered, the center pole piece 21 enters aperture 13 and the base portion 11 is free to be clamped by magnet 22.

Figure 4:
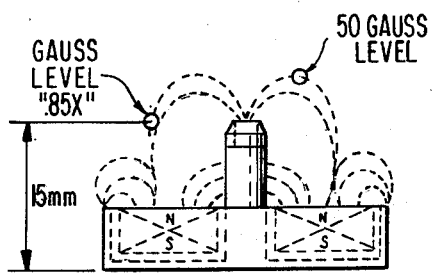
FIG. 4 is a schematic view which illustrates the flux field between the base portion 11 of the magnetic tape reel 10 and the clutch magnet 22.
Figure 4:
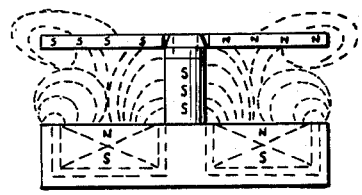

The center pole piece 21 is advantageously lengthed as described in the aforesaid U.S. Pat. No. 4,343,441 to reduce the effects of the magnetic field on the recorded information on the tape. FIG. 4 illustrates the confinement of substantially all of the magnetic flux to the underside of the base portion 11.

In the event the magnetic tape reel 10 becomes tilted, as shown in FIG. 1, the nonmagnetic bushing 23 will prevent the magnetic tape reel 10 from shunting the center pole piece 21 and cup like shaped member 17.

The bushing 23 at the distal end portion of the center pole piece is preferably stainless steel. Those skilled in the art will recognize that other nonmagnetic materials will in many instances provide equivalent performance.

Thus, the magnetic clutch assembly 16 has been improved with respect to its ability to receive a magnetic tape reel 10 without shunting the center pole piece with the cup like member 17 or experiencing a counter force during positioning of the magnetic tape reel 10. Those skilled in the art will recognize other embodiments defined more particularly by the claims which follow.

What is claimed is:

1. In a magnetic clutch arrangement for clamping a magnetic tape reel for rotation with a motor shaft, said clamping arrangement including a center pole piece coaxially located with respect to a doughnut shaped planar magnet, said magnetic tape reel including along a base portion thereof a plate of magnetic material having an opening for receiving said center pole piece, whereby said base portion is magnetically clamped to said planar magnet, the improvement comprising:

a nonmagnetic material located at the tip of said center pole piece, said material reducing the magnetic force between said center pole piece and plate during centering of said plate opening with respect to said center pole piece.

2. In a magnetic clutch assembly for securing a magnetic tape reel for rotation, said clutch assembly including a rotatable planar magnet and a magnetic pole piece normal to said magnet, wherein said magnetic tape reel is held to said magnet along a base portion and said magnetic pole piece is received through a central aperture in said tape reel, the further improvement comprising:

a nonmagnetic bushing circumferentially enclosing an end portion of said magnetic pole piece, said bushing reducing the magnetic attraction between said pole piece and said magnetic tape reel base during insertion of said pole piece in said aperture.

3. The improvement of claim 2, wherein said nonmagnetic bushing is stainless steel.

* * * * *